US012198852B2

(12) United States Patent
Hermsen

(10) Patent No.: US 12,198,852 B2
(45) Date of Patent: Jan. 14, 2025

(54) MAGNETIC TOROID AND A MAGNETICALLY ACTUATED ROTARY COUPLING DEVICE COMPRISING THEREOF

(71) Applicant: Franciscus Johannes Hermsen, Kuala Lumpur (MY)

(72) Inventor: Franciscus Johannes Hermsen, Kuala Lumpur (MY)

( * ) Notice: Subject to any disclaimer, the term of this patent is extended or adjusted under 35 U.S.C. 154(b) by 0 days.

(21) Appl. No.: 17/779,123

(22) PCT Filed: Jan. 28, 2022

(86) PCT No.: PCT/MY2022/050007
§ 371 (c)(1),
(2) Date: May 23, 2022

(87) PCT Pub. No.: WO2023/140725
PCT Pub. Date: Jul. 27, 2023

(65) Prior Publication Data
US 2024/0212903 A1 Jun. 27, 2024

(30) Foreign Application Priority Data
Jan. 20, 2022 (MY) ............................ PI2022000412

(51) Int. Cl.
*H01F 7/02* (2006.01)
*H01F 7/14* (2006.01)

(52) U.S. Cl.
CPC ........... *H01F 7/021* (2013.01); *H01F 7/0242* (2013.01); *H01F 7/0273* (2013.01); *H01F 7/14* (2013.01)

(58) Field of Classification Search
CPC ...... H01F 7/021; H01F 7/0242; H01F 7/0273; H01F 7/14
See application file for complete search history.

(56) References Cited

U.S. PATENT DOCUMENTS 5,063,004 A * 11/1991 Leupold ................ H01F 41/028 264/328.3
7,116,018 B2 10/2006 Strobl
(Continued)

FOREIGN PATENT DOCUMENTS

DE 202005020288 U1 * 6/2007 ............. F04D 13/02
KR 20070015944 A 2/2007
KR 20130084538 A 7/2013

OTHER PUBLICATIONS

Anvar Shukurov et al. Dynamo action in Mobius flow. Physical Review E, 78, Aug. 1, 2008,pp. 025301-1, 025301-3; and figures 1, 3.

*Primary Examiner* — Mohamad A Musleh

(57) ABSTRACT

The present invention relates to a magnetic toroid (100) characterized by a Möbius-like toroid twisted by a degree, wherein the cross section of the Möbius-like toroid is a closed shape with at least four straight sides, wherein each side of the Möbius-like toroid is orthogonally magnetized to form the magnetic toroid (100), thereby creating a magnetic field having rotating polarity around the magnetic toroid (100) when the magnetic toroid (100) is spinning on its axis. The present invention also relates to a magnetically actuated rotary coupling device (200) comprising a first magnetic toroid (101) and a second magnetic toroid (102) being disposed adjacent to the first magnetic toroid (101), wherein the first magnetic toroid (101) is rotatable on its own axis relative to motion of the second magnetic toroid (102) when portions of their respective magnetic fields interact with each other.

13 Claims, 3 Drawing Sheets

(56) References Cited

U.S. PATENT DOCUMENTS

| | | | |
|---|---|---|---|
| 7,154,368 | B2 | 12/2006 | Sweeney et al. |
| 9,478,336 | B2 | 10/2016 | Henning, III |
| 2021/0336507 | A1 | 10/2021 | Tokunaga et al. |

* cited by examiner

MAGNETIC TOROID AND A MAGNETICALLY ACTUATED ROTARY COUPLING DEVICE COMPRISING THEREOF

TECHNICAL FIELD

The present invention pertains to the field of magnetic rotary devices. More particularly, the present invention relates to a magnetic toroid and a magnetically actuated rotary coupling device comprising the magnetic toroid.

BACKGROUND ART

Various rotary apparatuses are developed based on electromagnetism in the past. For instance, in an electric induction motor, an alternative electromagnetic force is generated between a rotor and a stator of the induction motor, thereby rotating the rotor in a direction according to the rotating direction of the electromagnetic force. A shaft is mechanically coupled to the rotor, and subsequently the shaft can actuate a mechanical load to rotate.

U.S. Pat. No. 7,116,018B2 discloses an oscillating motor that has a rotor rotation of about ±15° from a rest position. The rotor has two salient poles which face a respective permanent magnet across a small air gap. The stator has a laminated stator core supporting the magnets and also two salient poles each supporting a stator coil. The stator poles confront the rotor across a small air gap between the rotor poles. When no current is flowing through the coils, the rotor rests in a rest position with the poles aligned between the north and south poles of the magnets. During operations, the stator coils induce like magnetic poles in the stator poles which in turn induce like magnetic poles in the rotor poles causing the rotor to swing towards opposite magnetic poles of the permanent magnets. When current flows in the reverse direction, the rotor swings to the opposite poles of the magnets.

US20210336507A1 relates to an electric motor system including a rotor, a rotary shaft provided to have an axis line thereof to be displaceable relative to a rotation center and outputting a rotational force of the rotor, a stator for generating the rotational force on the rotor by an electromagnetic force, a magnetic bearing for rotatably supporting the rotary shaft by an electromagnetic force, a permanent magnet mounted on the rotary shaft and having a plurality of magnetic poles arranged in a circumferential direction around the axis line of the rotary shaft, three detection elements arranged in the circumferential direction around the rotation center and detecting a magnetic flux generated from the permanent magnet, a coordinate detection section for determining coordinates of the axis line of the rotary shaft based on output values of two detection elements selected out of the three detection elements in accordance with a rotation angle of the rotary shaft, and a control section for controlling the magnetic bearing so that the axis line of the rotary shaft is brought to be close to the rotation center based on the coordinates determined by the coordinate detection section.

The aforementioned references may strive to provide the improved rotary apparatus. Nevertheless, they still have a number of limitations and shortcomings. For example, the rotation of the rotary apparatus is actuated by an electromagnetic field, which requires a lot of electrical powers to be supplied to the stator of the rotary apparatus. Moreover, the rotary apparatus relies extensively on precise magnetic field reversal to keep it operating.

Accordingly, it can be seen that there exists a need to have a magnetically actuated rotary coupling device which can overcome the aforesaid limitations and shortcomings.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

An objective of the present invention is to provide a magnetic toroid which is capable of providing a magnetic field having rotating polarity at every point around the magnetic toroid when the magnetic toroid is spinning on its axis. This offers interesting pathways for electricity generation as magnetic flux is generated in a more refined way with significantly less stress fluctuations compared to rotating a single magnet across 3 areas of high resistance (i.e., the coils).

Another objective of the present invention is to provide a magnetically actuated rotary coupling device which converts vibrations or slight movements into torque and magnetic flux to generate electricity.

It is also an objective of the present invention to provide complex magnetic fields on the inside or inner side of a magnetic toroid, which can have impact on magnetic fluids like oxygen or nanoparticle solutions.

Accordingly, these objectives can be achieved by following the teachings of the present invention. The present invention relates to a magnetic toroid characterized by a Möbius-like toroid twisted by a degree, in which the cross section of the Möbius-like toroid is a closed shape with at least four straight sides, in which each side of the Möbius-like toroid is orthogonally magnetized to form the magnetic toroid, thereby creating a magnetic field having rotating polarity around the magnetic toroid when the magnetic toroid is spinning on its axis.

The present invention also relates to a magnetically actuated rotary coupling device comprising a first magnetic toroid and a second magnetic toroid being disposed adjacent to the first magnetic toroid, in which the first magnetic toroid is rotatable on its own axis relative to motion of the second magnetic toroid when portions of their respective magnetic fields interact with each other.

The foregoing and other objects, features, aspects and advantages of the present invention will become better understood from a careful reading of a detailed description provided herein below with appropriate reference to the accompanying drawings.

BRIEF DESCRIPTION OF THE ACCOMPANYING DRAWINGS

So that the manner in which the above recited features of the present invention can be understood in detail, a more particular description of the invention, briefly summarized above, may have been referred by embodiments, some of which are illustrated in the appended drawings. However, it is to be noted that the appended drawings illustrate only typical embodiments of this invention and are therefore not to be considered limiting of its scope. The invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

Figure 1:
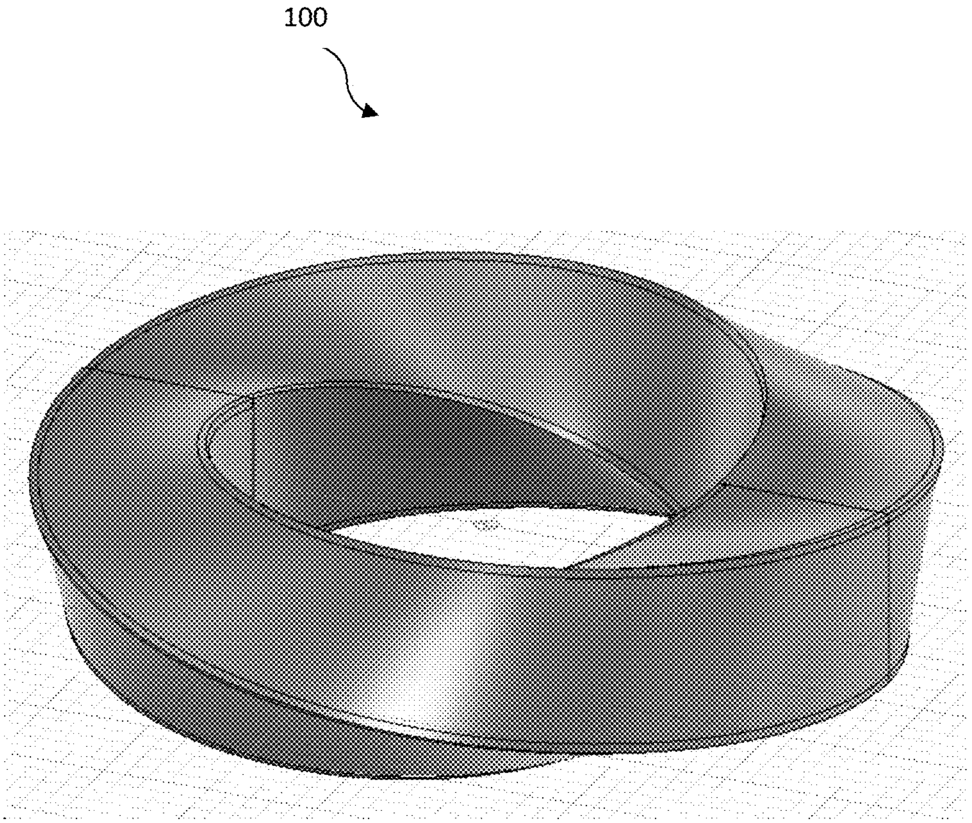
FIG. 1 illustrates a magnetic toroid in accordance with a preferred embodiment of the present invention.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e., meaning having the potential to), rather than the mandatory sense, (i.e., meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like are included in the specification solely to provide a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

The present invention relates to a magnetic toroid (100) characterized by a Möbius-like toroid twisted by a degree, in which the cross section of the Möbius-like toroid is a closed shape with at least four straight sides, in which each side of the Möbius-like toroid is orthogonally magnetized to form the magnetic toroid (100), thereby creating a magnetic field having rotating or alternating polarity when the magnetic toroid (100) is spinning on its axis.

In accordance with an embodiment of the present invention, the Möbius-like toroid can be twisted by 90 degrees, 180 degrees, 270 degrees, 360 degrees or any other angle.

In accordance with an embodiment of the present invention, the closed shape includes, but is not limited to, a square, a rectangle, a pentagon, a hexagon or any other polygon with at least four straight sides.

In accordance with an embodiment of the present invention, each side of the magnetic toroid (100) can have a polarity of North or South and each adjacent side of the side can have a like or opposite polarity.

In accordance with an embodiment of the present invention, the Möbius-like toroid can be produced by 3D printing or additive manufacturing. The Möbius-like toroid resembles a rectangular bar in which one end is twisted by a certain degree with respect to another end and both ends are joined to form a closed loop. If the material of the Möbius-like toroid is ferromagnetic, the Möbius-like toroid can be orthogonally magnetized by placing magnetizing coils according to the orientation of the Möbius-like toroid such that the magnetic field is perpendicular to the surface of the Mobius-like toroid. If the material of the toroid is not ferromagnetic, the toroid can be orthogonally magnetized by placing a plurality of magnet bars according to the orientation of the Möbius-like toroid such that the magnetic field is perpendicular to the surface of the Möbius-like toroid.

In accordance with an embodiment of the present invention, each side of the magnetic toroid (100) can have different magnetic strength and patterns. For example with respect to the different magnetic strength, a first side of the magnetic toroid (100) can be designed to have considerably higher magnetic strength in comparison to other sides of the magnetic toroid (100). For example with respect to the different magnetic patterns, if the magnetic toroid (100) is made by attaching the magnet bars to the Möbius-like toroid, each side of the magnetic toroid (100) can have different shapes and/or arrangements of the magnet bars and thus different magnetic patterns can be formed.

In accordance with an embodiment of the present invention, complex magnetic fields generated on the inside or inner side of the magnetic toroid (100) can have various impacts on magnetic fluids such as, but is not limited to, oxygen and nanoparticle solutions.

In reference to FIGS. 1 to 3, the present invention will now be described in more detail.

Figure 2:
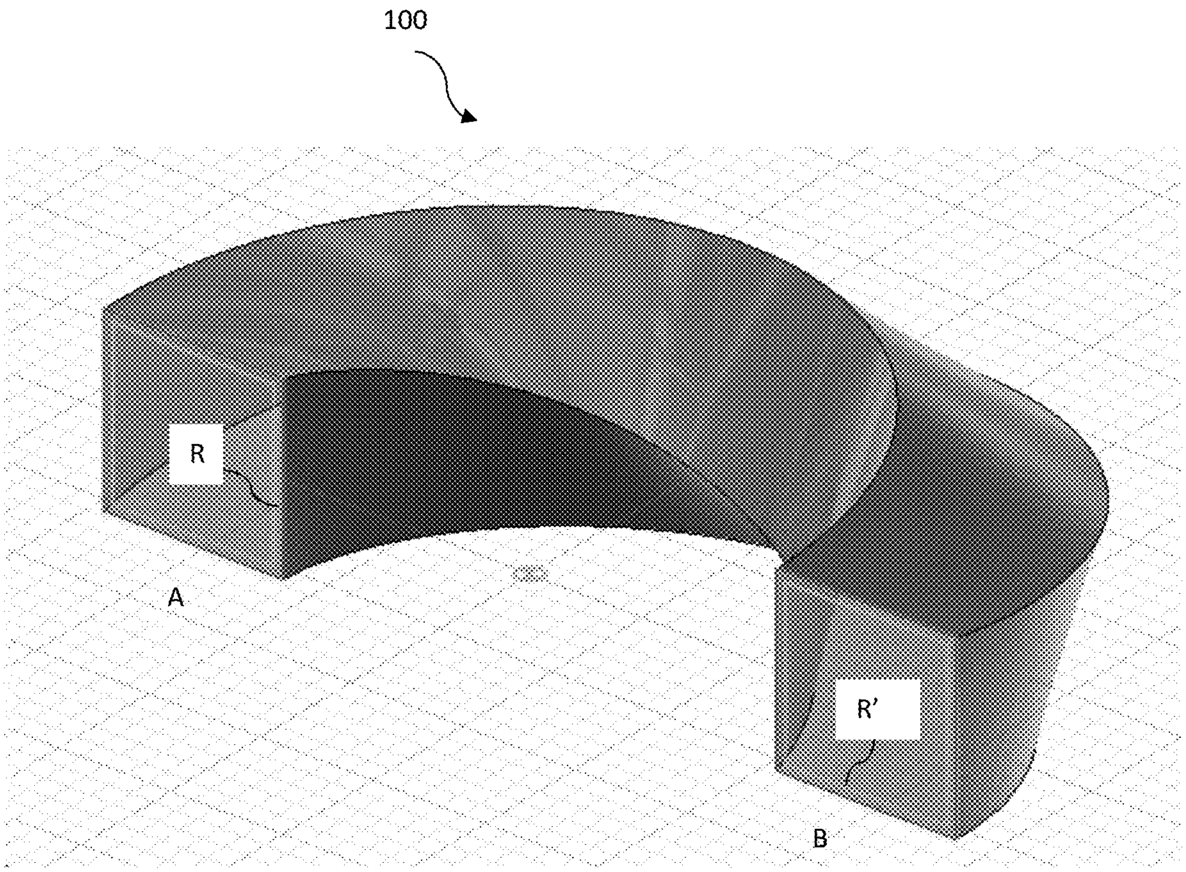
FIG. 2 illustrates a half cut of the magnetic toroid of FIG. 1 having a square-shaped cross section according to one of the embodiments.

FIG. 1 illustrates a magnetic toroid (100) in accordance with a preferred embodiment of the present invention. The magnetic toroid (100) is formed based on a Möbius-like toroid twisted by 180 degrees. FIG. 2 illustrates a half cut of the magnetic toroid of FIG. 1 having a square-shaped cross section according to one of the embodiments. The cross section of the magnetic toroid (100) is square and the four sides of the magnetic toroid (100) can be magnetized to be in North-North-South-South polarity or North-South-North-South polarity so that a magnetic field having alternating or rotating polarity can be created around the magnetic toroid (100) when the magnetic toroid (100) is spinning on its axis. For example, a particular point around the magnetic toroid (100) can initially experience a magnetic field having North polarity and thereafter start to experience a magnetic field having South polarity when the magnetic toroid (100) rotates on its axis. Referring to FIG. 2, assuming that the right side (denoted by R) of the square cross section is having a North pole at point A, the right side (denoted by R') having the North pole will shift to the bottom side of the square cross section at point B due to the twisting of the magnetic toroid (100). Similarly, assuming that the top side of the square cross section is having a South pole at point A, the top side having the South pole will shift to the left side of the square cross section at point B due to the twisting of the magnetic toroid (100).

The present invention also relates to a magnetically actuated rotary coupling device (200) comprising a first magnetic toroid (101) and a second magnetic toroid (102) being disposed adjacent to the first magnetic toroid (101), in which the first magnetic toroid (101) is rotatable on its own axis relative to motion of the second magnetic toroid (102) when portions of their respective magnetic fields interact with each other.

In accordance with a preferred embodiment of the present invention, the motion of the second magnetic toroid (102) is tilting about an axis. It is anticipated however that the motion of the second magnetic toroid (102) can also be a rotation about an axis.

In accordance with a preferred embodiment of the present invention, the axis of the tilting of the second magnetic toroid (102) is perpendicular to the axis of the rotation of the first magnetic toroid (101). It is anticipated however that the axis of the tilting of the second magnetic toroid (102) and the axis of the rotation of the first magnetic toroid (101) can be of other arrangements.

In accordance with an embodiment of the present invention, the portions of the respective magnetic fields interacting with each other are of opposite polarity to rotate the first magnetic toroid (101) by attractive forces therebetween.

In accordance with an embodiment of the present invention, the portions of the respective magnetic fields interacting with each other are of like polarity to rotate the first magnetic toroid (101) by repulsive forces therebetween.

Figure 3:
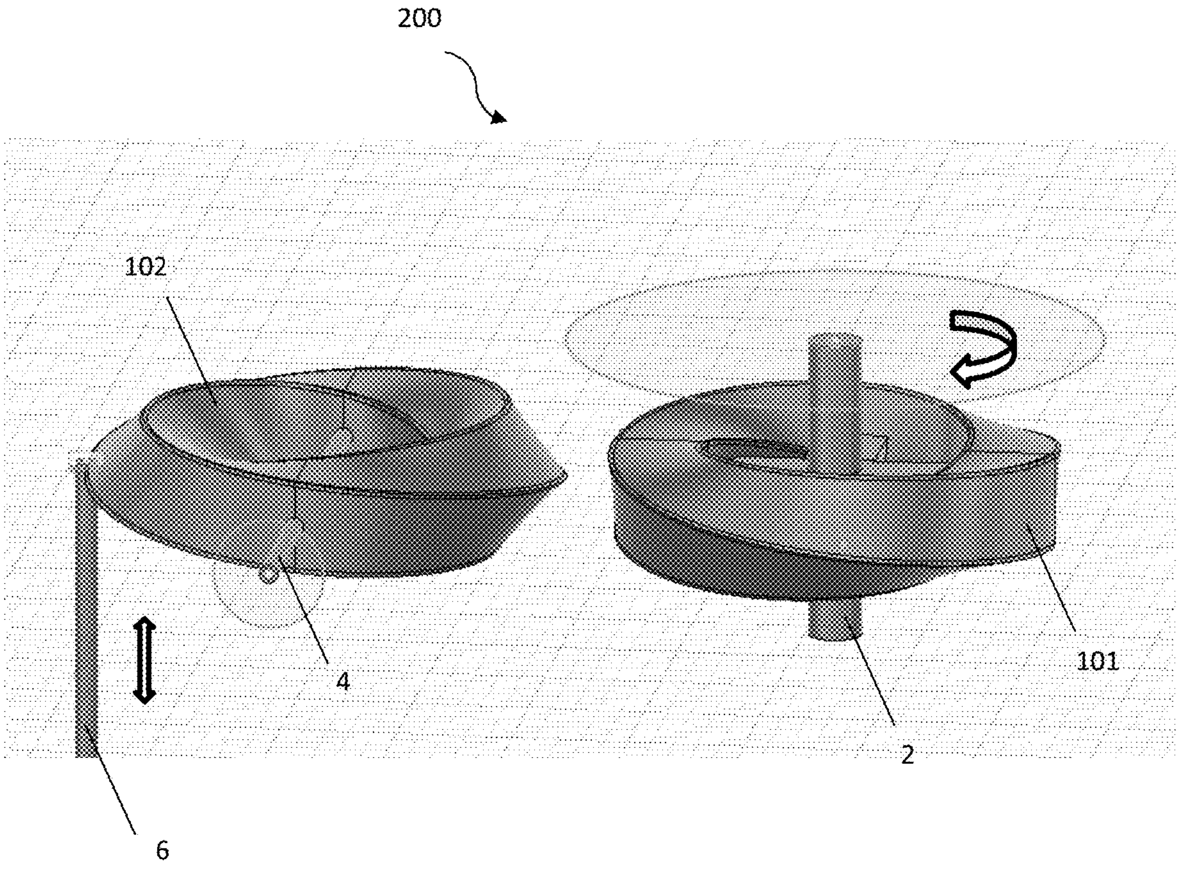
FIG. 3 illustrates a magnetically actuated rotary coupling device in accordance with a preferred embodiment of the present invention.

FIG. 3 illustrates a magnetically actuated rotary coupling device (200) in accordance with a preferred embodiment of the present invention. The magnetically actuated rotary coupling device (200) comprises a first magnetic toroid (101) and a second magnetic toroid (102) disposed in the vicinity of or adjacent to the first magnetic toroid (101). The first magnetic toroid (101) is formed based on a Möbius-like toroid twisted by 180 degrees. The cross section of the first magnetic toroid (101) is square and the four sides of the first magnetic toroid (101) are magnetized to be in North-South-North-South polarity. Similarly, the second magnetic toroid (102) is formed based on a Möbius-like toroid twisted by 180 degrees. The cross section of the second magnetic toroid (102) is square. However, the four sides of the second magnetic toroid (102) are magnetized to be in North-North-South-South polarity. Further, the first magnetic toroid (101) is equipped with a vertical shaft (2) so that it can rotate about a vertical axis which is its own axis, whereas the second magnetic toroid (102) is equipped with a horizontal shaft (4) so that it can rotate about a horizontal axis. An actuating means such as a rod (6) is attached to the edge of the second magnetic toroid (102) to actuate the second magnetic toroid (102). When the rod (6) is moved upwards and downwards, the second magnetic toroid (102) may tilt up and down about the horizontal axis. The tilting motion of the second magnetic toroid (102) is similar to the motion of a teeterboard where a board is supported by a middle pivot point between two ends and one end goes up when another end goes down. Thereafter, portions of the magnetic fields between the first magnetic toroid (101) and the second magnetic toroid (102) interact with each other, thereby causing the first magnetic toroid (101) to rotate clockwise or anticlockwise about the vertical axis. When the portions of the magnetic fields are of like polarity, the first magnetic toroid (101) is rotated by repulsive forces between the magnetic fields. When the portions of the magnetic fields are of opposite polarity, the first magnetic toroid (101) is rotated by attractive forces between the magnetic fields. The rate and direction of the rotation of the first magnetic toroid (101) can be selectively varied by adjusting the rod (6).

In accordance with an embodiment of the present invention, the outer diameter of the first magnetic toroid (101) is smaller than the inner diameter of the second magnetic toroid (102) such that the first magnetic toroid (101) can be concentrically disposed within the second magnetic toroid (102). When the second magnetic toroid (102) is tilted or moved, the first magnetic toroid (101) may rotate within the second magnetic toroid (102) due to the interactions between their respective magnetic fields. In accordance with another embodiment of the present invention, the outer diameter of the second magnetic toroid (102) is smaller than the inner diameter of the first magnetic toroid (101) such that the second magnetic toroid (102) can be concentrically disposed within the first magnetic toroid (101). When the second magnetic toroid (102) is tilted or moved, the first magnetic toroid (101) may rotate around the second magnetic toroid (102) due to the interactions between their respective magnetic fields. It is also readily understood that the embodiments of the present invention are not limited to just two magnetic toroids (100). It is possible to have multiple magnetic toroids (100) concentrically disposed within the outermost magnetic toroid (100).

The present invention also relates to a magnet-driven system comprising the aforementioned magnetically actuated rotary coupling device (200). A torque created by the rotation of the first magnetic toroid (101) in the magnetically actuated rotary coupling device (200) can be utilized to drive other mechanical loads. For example, the vertical shaft (2) of the first magnetic toroid (101) can be connected to a turbine, a drive shaft, a propeller or any other mechanical load in order to transmit the generated torque of the first magnetic toroid (101). Furthermore, the magnetic flux generated from the rotation of the first magnetic toroid (101) can also be utilized to generate electricity by placing coils alongside the first magnetic toroid (101). Moreover, the magnet-driven system can rely on wave power or body movement to actuate the second magnetic toroid (102), which in turn rotates the first magnetic toroid (101) to generate electricity or drive other mechanical loads. For instance, the magnet-driven system can be applied in such a way that electricity is generated from a coil-covered first magnetic toroid (101) to charge a mobile phone when the mobile phone owner associated with a second magnetic toroid (102) is walking. Nevertheless, it is anticipated that the magnet-driven system can also be applied for other uses.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but provides the broadest scope of consistent with the principles and the novel and inventive features disclosed or suggested herein. Accordingly, the invention is anticipated to hold on to all other such alternatives, modifications, and variations that fall within the scope of the present invention and appended claim.

What is claimed is:

1. A magnetic toroid (100), characterized by:

a Möbius-like toroid twisted by a degree;

wherein the cross section of the Mobius-like toroid is a closed shape with at least four straight sides;

wherein each side of the Möbius-like toroid is orthogonally magnetized to form the magnetic toroid (100), thereby creating a magnetic field having rotating polarity around the magnetic toroid (100) when the magnetic toroid (100) is spinning on its axis.

2. The magnetic toroid (100) as claimed in claim 1, wherein the Möbius-like toroid is twisted by 90 degrees, 180 degrees, 270 degrees, 360 degrees or any other angle.

3. The magnetic toroid (100) as claimed in claim 1, wherein the closed shape includes a square, a rectangle, a pentagon, a hexagon or any other polygon with at least four straight sides.

4. The magnetic toroid (100) as claimed in claim 1, wherein each side of the magnetic toroid (100) has a polarity of North or South and each adjacent side of the side has a like or opposite polarity.

5. The magnetic toroid (100) as claimed in claim 3, wherein the closed shape is a square having four straight sides arranged in North-North-South-South polarity or North-South-North-South polarity.

6. The magnetic toroid (100) as claimed in claim 1, wherein each side of the toroid is orthogonally magnetized by placing a plurality of magnet bars or magnetizing coils.

7. A magnetically actuated rotary coupling device (200) comprising:

a first magnetic toroid (101) of claim 1; and a second magnetic toroid (102) of claim 1, being disposed adjacent to the first magnetic toroid (101);

wherein the first magnetic toroid (101) is rotatable on its own axis relative to motion of the second magnetic toroid (102) when portions of their respective magnetic fields interact with each other.

8. The magnetically actuated rotary coupling device (200) as claimed in claim 7, wherein the motion of the second magnetic toroid (102) is tilting about an axis.

9. The magnetically actuated rotary coupling device (200) as claimed in claim 8, wherein the axis of the tilting of the second magnetic toroid (102) is perpendicular to the axis of the rotation of the first magnetic toroid (101).

10. The magnetically actuated rotary coupling device (200) as claimed in claim 7, wherein the portions of the respective magnetic fields interacting with each other are of like polarity to rotate the first magnetic toroid (101) by repulsive forces therebetween.

11. The magnetically actuated rotary coupling device (200) as claimed in claim 7, wherein the portions of the respective magnetic fields interacting with each other are of opposite polarity to rotate the first magnetic toroid (101) by attractive forces therebetween.

12. A magnet-driven system comprising a magnetically actuated rotary coupling device (200) of claim 7.

13. A magnetically actuated rotary coupling device (200) comprising:

a first magnetic toroid (101) of claim 1; and a second magnetic toroid (102) of claim 1, being concentrically disposed within the first magnetic toroid (101);

wherein the second magnetic toroid (102) is rotatable relative to motion of the first magnetic toroid (101) when portions of their respective magnetic fields interact with each other.

* * * * *